No. 670,643. Patented Mar. 26, 1901.
F. G. SARGENT.
WOOL CLEANING MACHINE.
(Application filed July 12, 1900.)

(No Model.) 2 Sheets—Sheet 1.

Witnesses:
Oscar F. Hill
Edith J. Anderson.

Inventor:
Frederick G. Sargent
by MacLeod Calvert Randall
Attorneys.

No. 670,643. Patented Mar. 26, 1901.
F. G. SARGENT.
WOOL CLEANING MACHINE.
(Application filed July 12, 1900.)

(No Model.) 2 Sheets—Sheet 2.

Witnesses:
Oscar F. Hill
Edith J. Anderson

Inventor:
Frederick G. Sargent
by Macleod Calvert & Randall
Attorneys.

THE NORRIS PETERS CO., PHOTO-LITHO., WASHINGTON, D. C.

UNITED STATES PATENT OFFICE.

FREDERICK G. SARGENT, OF GRANITEVILLE, MASSACHUSETTS.

WOOL-CLEANING MACHINE.

SPECIFICATION forming part of Letters Patent No. 670,643, dated March 26, 1901.

Application filed July 12, 1900. Serial No. 23,408. (No model.)

*To all whom it may concern:*

Be it known that I, FREDERICK G. SARGENT, a citizen of the United States, residing at Graniteville, in the county of Middlesex, State of Massachusetts, have invented a certain new and useful Improvement in Wool-Cleaning Machines, of which the following is a specification, reference being had therein to the accompanying drawings.

The present invention relates to wool-cleaning machines, and is applicable to many types thereof; but it is shown and described herein in connection with a type of machine which is the subject-matter of my patent of May 8, 1900, No. 649,215. The old parts of such machine accordingly will be briefly identified with reference to the accompanying drawings, the new features adapted for coöperation therewith will be fully explained, and the salient points of the invention will be defined in the claims at the close of this specification.

Figure 2:
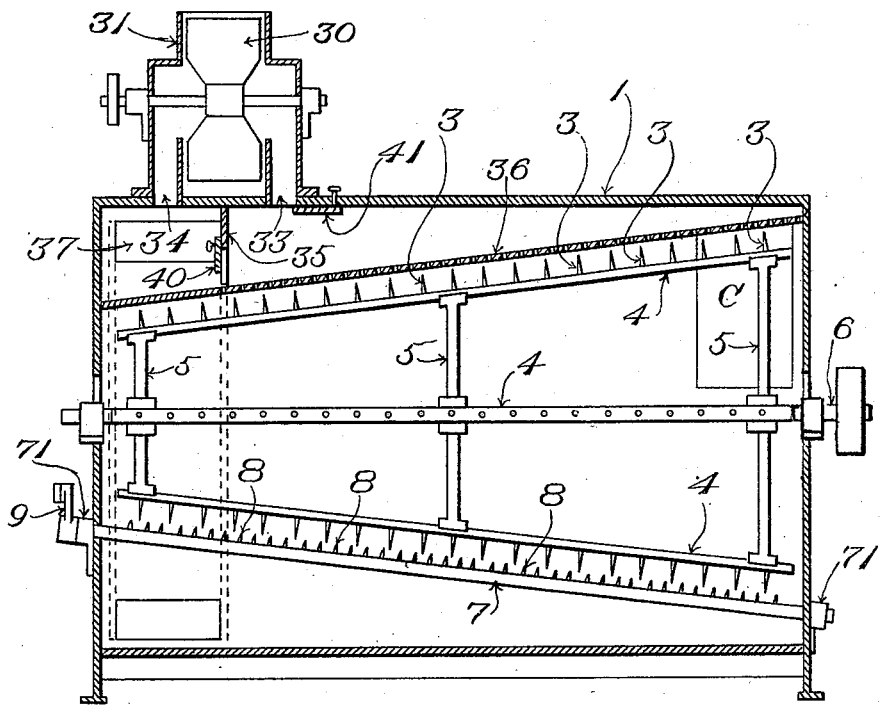
Figure 1:
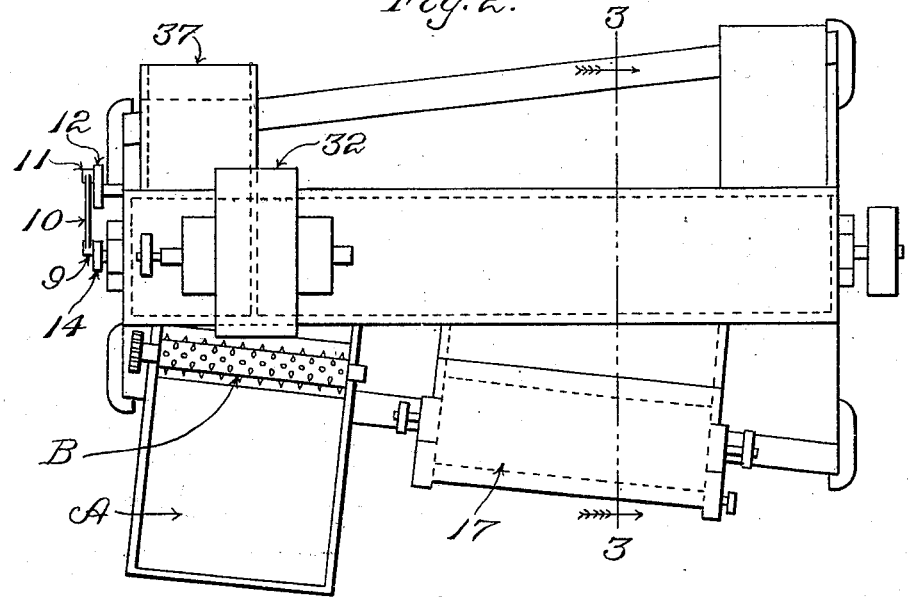
Figure 4:
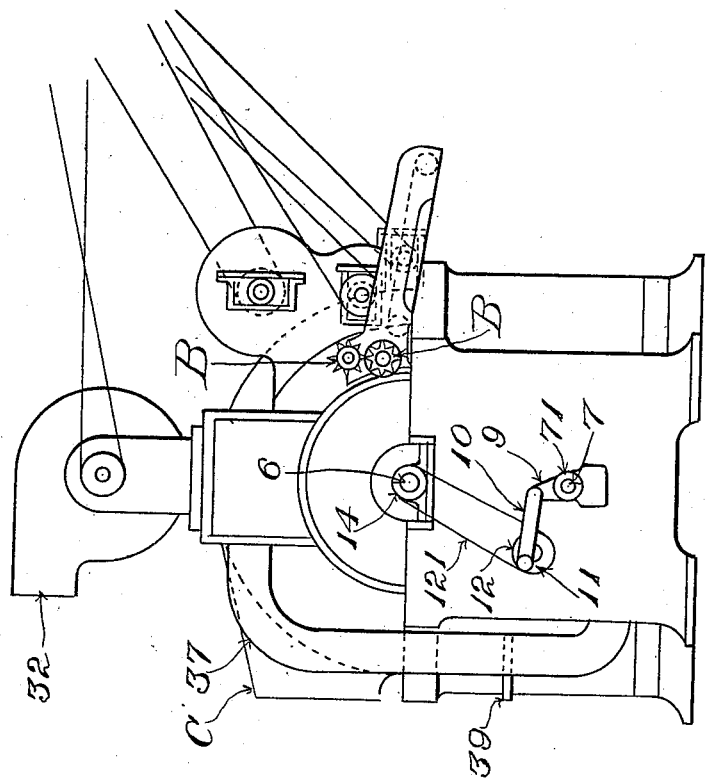
Figure 3:
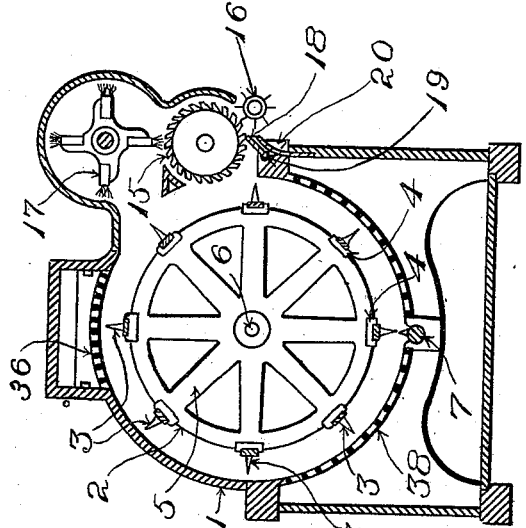
Figure 5:
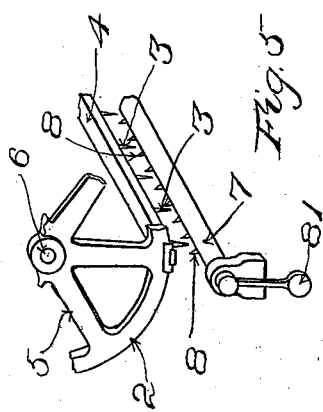

In the drawings, Figure 1 is a plan view of a machine having the invention applied thereto. Fig. 2 is a middle vertical longitudinal section thereof. Fig. 3 is a transverse vertical section on the line 3 3 of Fig. 1 looking in the direction indicated by the arrows at the ends of such line. Fig. 4 is a view of the right-hand end of the machine in Fig. 1. Fig. 5 is a view showing a modification.

1 designates the casing of the machine.

A is a feed belt or apron located at or adjacent one end of the said casing 1 and upon which the fiber intended to be operated upon is placed. A pair of feed-rolls is provided at B B for conveying the wool from the feed-apron A to the picking means.

C is a discharge chute or passage through which the wool is ejected after having been subjected to the action of the picking means, the point of discharge being located at or adjacent the end of the casing which is opposite to that at which the feed devices are placed.

Within the casing 1 of the machine is contained a picking-cylinder 2. I have herein shown the picking-cylinder of a conical form, as in my said patent, which form has the function of passing the wool gradually from the point of introduction of the wool by the feed at the smaller end of the cone to its point of discharge at the larger end thereof. The present invention, nevertheless, is equally adapted to other forms of machine in which the wool is passed gradually from end to end of the picking-cylinder and also to forms in which such longitudinal motion of the wool does not take place.

The teeth of the picking-cylinder (indicated at 3 3) are set on longitudinal bars 4 4, mounted on the extremities of spiders 5 5 on the shaft 6; but this mode of supporting the teeth is not essential.

Adjacent the periphery of the picking-cylinder I employ a comb consisting of a shaft 7, located beneath the picking-cylinder, close to the periphery thereof, and provided with teeth 8 8, projecting upward into proximity to the paths of the picker-teeth. The shaft 7 is mounted in suitable bearings, as at 71 71, applied to the ends of the casing of the machine or elsewhere, as preferred. The wool as it moves around with the teeth of the picking-cylinder is carried against the teeth 8 8, which coact with the teeth of the picking-cylinder in opening the wool. In accordance with my present invention for the purpose of enabling the wool which is detained by the teeth 8 8 and collects thereon to be stripped from the said teeth 8 8 I arrange the comb which is constituted by the shaft 7 and teeth 8 to rock or swing, so that at intervals it will turn forwardly in the direction in which the proximate portion of the periphery of the picking-cylinder is moving. As the teeth 8 8 incline forwardly in the direction of movement of the teeth of the picking-cylinder the latter teeth strip the wool from the said teeth 8 8. As a convenient means of swinging the comb 7 8 8 I have shown in the drawings an arrangement of devices in which the shaft 7 of the comb is connected operatively with the shaft 6 of the picking-cylinder, the connections comprising a crank 9 on the shaft 7, a pitman 10, pivoted to said crank, a crank 11, to which the pitman runs, a pulley 12, carrying the said crank, and a belt 121, connecting the crank-pulley with a pulley 14 on the shaft 6. I do not limit myself to the employment of this particular mechanism, however, for effecting the vibration of the comb, nor is it in all cases necessary that the vibration should be effected in a positive manner. In some embodiments of the invention I dispense entirely with such positively-acting mechanism, as in Fig. 5, using only a balance-weight 81 on the rock-shaft to maintain the teeth 8 in their normal position. In this position the comb will accumulate a certain charge of wool, and when it has done so the picker-teeth and the wool rotating thereon will engage with it and by overcoming the effect of the balance-weight will cause the comb to turn into the position in which its teeth are inclined, in the direction of the motion of the picker-teeth. The latter will then act to strip off the charge of fiber on the comb, after which the balance-weight will cause the comb to return to its normal position. From the picking-cylinder the wool is delivered to a burring-cylinder 15, whose periphery contiguous to that of the picking-cylinder moves oppositely thereto.

16 is a rotating guard for the purpose of knocking the burs off the burring-cylinder, while allowing the fiber lodged between the bur-teeth to pass on. Such fiber is thereafter removed from the burring-cylinder by the rotating brush 17, which has a surface speed greater than that of the cylinder. The brush 17 returns the fiber to the picking-cylinder at a point somewhat nearer the discharge end of the latter than that at which the fiber left the same.

Heretofore it has been found that considerable fiber was knocked off by the rotating guard 16 along with the burs. For the purpose of preventing this waste a yielding evener or wiper may be arranged to act against the surface of the burring-cylinder to lay the fiber more evenly and firmly thereon, while yielding when encountered by a bur or other hard substance and allowing the latter to pass without being pressed in between the bur-teeth. Therefore when the wool reaches the rotating guard 16 the burs are being carried, as before, above the points of the bur-teeth and are readily removed, while the fiber is held more firmly between the said teeth, and hence is less likely than before to be removed. Thus at 18 is shown a plate that is adapted to swing on its pivot 19, it being supported in operative position by the spring 20.

A further feature of my invention relates to the control of the air-currents in the machine.

30 is a fan located in an upward extension 31 of the casing 1 and discharging air through the outlet 32.

33 and 34 are ports leading from the main space of the machine to the fan. Between the said ports is located a transverse partition 35.

36 is a screen located just above the picking-cylinder to prevent the escape of wool therefrom. The larger portion of the screen, lying to the left in Figs. 1 and 2 of the partition 35, is perforated, while the remainder, lying to the right of the said partition, is unperforated. From the space below the port 34 and to the right of the partition 35 a conduit 37 connects with the air-space beneath the picking-cylinder. A rack or perforated screen 38 extends just below the picking-cylinder and separates the same from the air-space beneath it. In the conduit 37 is a gate 39. In the partition 35 is a gate 40. In the port 33 is a gate 41. Now when the gate 40 is closed and the gates 39 and 41 are open air will be drawn both from above and from below the picking-cylinder. When gate 40 is open and the gate 39 is closed, the gate 41 still remaining open, air will be drawn only from above the picking-cylinder. If, however, the gate 39 is open and the gates 40 and 41 are closed, air will be drawn only from below the picking-cylinder.

The rack or screen under the picking-cylinder generally is more open than the screen above in order to allow the heavier particles of foreign matter to drop through as they are separated from the wool by the action of the picking-cylinder. It will be perceived that if when treating short staple fiber the draft should be taken from below the picking-cylinder a considerable amount of the short fiber would go to waste. Therefore when treating short staple fiber the dampers are arranged to cause the most or all of the draft to be taken from the top of the picking-cylinder. For long-fibered stock the draft can be taken from the bottom alone. When the stock is very dusty, the draft can be taken from both top and bottom at once. Thus with the aid of the air-passages and dampers the draft can be regulated to get the best results with the stock that is being cleaned.

I claim—

1. The combination of a picking-cylinder, and a comb, coöperating with said picking-cylinder and mounted adjacent thereto, and arranged to swing to enable the fiber detained by said comb to be stripped therefrom by the picking-cylinder, substantially as described.

2. The combination of a picking-cylinder, a pivoted comb adjacent thereto, and means to swing said comb to enable the fiber detained thereby to be stripped therefrom by the picking-cylinder, substantially as described.

3. A wool-cleaning machine comprising a picking-cylinder, air-spaces at opposite sides of the same, a discharge-fan, a passage from the fan to one of the said air-spaces, a passage from the fan to the other of the said air-spaces, a gate in each of said passages, a partition separating the two passages from each other and a gate in the said partition, substantially as described.

4. A wool-cleaning machine comprising a feed at or adjacent one end thereof, a discharge-opening at or adjacent the other end thereof, picking means operating to cause the material to be carried lengthwise of the machine from the feed to the discharge-opening, air-passages communicating with opposite sides of the said picking means, a fan with which said air-passages also communicate, and dampers to enable the draft to be taken from either or both sides of the picking means, at will, according as desired, substantially as described.

In testimony whereof I affix my signature in presence of two witnesses.

FREDERICK G. SARGENT.

Witnesses:
HERBERT V. HILDRETH,
ARTHUR E. DAY.